US012637080B1

(12) United States Patent
Lu et al.

(10) Patent No.: US 12,637,080 B1
(45) Date of Patent: May 26, 2026

(54) DECISION SYSTEM AND METHOD FOR CHANGING LANE

(71) Applicant: Automotive Research & Testing Center, Changhua County (TW)

(72) Inventors: Po-Han Lu, Changhua County (TW); Tsung-Ming Hsu, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 77 days.

(21) Appl. No.: 18/961,488

(22) Filed: Nov. 27, 2024

(51) Int. Cl.
*B60W 30/18* (2012.01)

(52) U.S. Cl.
CPC *B60W 30/18163* (2013.01); *B60W 30/18154* (2013.01); *B60W 2520/10* (2013.01); *B60W 2520/125* (2013.01); *B60W 2552/53* (2020.02); *B60W 2554/4041* (2020.02); *B60W 2554/4042* (2020.02); *B60W 2554/406* (2020.02); *B60W 2554/802* (2020.02); *B60W 2556/40* (2020.02)

(58) Field of Classification Search
CPC ..... B60W 30/18163; B60W 30/18154; B60W 2520/10; B60W 2520/125; B60W 2552/53; B60W 2554/4041; B60W 2554/4042; B60W 2554/406; B60W 2554/802; B60W 2556/40
See application file for complete search history.

(56) References Cited

U.S. PATENT DOCUMENTS

| | | | | |
|---|---|---|---|---|
| 9,227,632 | B1 * | 1/2016 | Lee | B60W 30/0953 |
| 11,012,873 | B1 * | 5/2021 | Mondragon | H04W 24/08 |
| 11,125,575 | B2 * | 9/2021 | Xu | G08G 1/09623 |
| 12,115,964 | B1 * | 10/2024 | Hawley | B60W 30/18163 |
| 2019/0164420 | A1 | 5/2019 | Wendt et al. | |
| 2019/0322281 | A1 * | 10/2019 | Wang | G01C 21/3658 |
| 2019/0391580 | A1 * | 12/2019 | Di Cairano | B60W 60/0027 |
| 2019/0391582 | A1 * | 12/2019 | Jung | B60W 30/16 |

FOREIGN PATENT DOCUMENTS

| | | | | |
|---|---|---|---|---|
| CN | 113272192 A | 8/2021 | | |
| CN | 115376346 A | 11/2022 | | |
| CN | 115335885 B | 1/2024 | | |
| WO | WO-02055335 A1 * | 7/2002 | | G08G 1/162 |

(Continued)

*Primary Examiner* — Joseph J Dallo
(74) *Attorney, Agent, or Firm* — CKC & Partners Co., LLC

(57) ABSTRACT

A decision system for changing lane includes a vehicle body, a detecting device and a controlling device. A decision making module decides a decision type based on a lane-changing type and whether a lane-changing is feasible. A decision exertion planning module provides a decision exerting plane. As the feasibility checking module checks that the lane-changing is feasible and the advancing lane-changing flag is decided by the lane-changing type deciding module, the decision type is an advancing lane-changing decision, and the decision exerting plan includes a normal lane-changing path. As the feasibility checking module checks that the lane-changing is feasible and the immediate lane-changing flag is decided by the lane-changing type deciding module, the decision type is an immediate lane-changing decision, and the decision exerting plan includes an positive lane-changing path.

18 Claims, 7 Drawing Sheets

(56) References Cited

FOREIGN PATENT DOCUMENTS

| | | | | | |
|---|---|---|---|---|---|
| WO | WO-2004077377 | A1 | * | 9/2004 | ............... G08G 1/07 |
| WO | WO-2018192352 | A1 | * | 10/2018 | ......... G01C 21/3658 |
| WO | WO-2020201797 | A1 | * | 10/2020 | ............. B60R 21/00 |
| WO | WO-2020238904 | A1 | * | 12/2020 | ........... G08G 1/0125 |
| WO | WO-2021061574 | A1 | * | 4/2021 | ........ H03M 13/1134 |
| WO | WO-2021117132 | A1 | * | 6/2021 | ............ B60W 50/14 |

* cited by examiner

DECISION SYSTEM AND METHOD FOR CHANGING LANE

BACKGROUND

Technical Field

The present disclosure relates to a decision system and a decision method. More particularly, the present disclosure relates to a decision system for changing lane and a decision method for changing lane.

Description of Related Art

Recently, autonomous vehicles develop quickly. The vehicles can employee sensors, and a decision center may make decisions, e.g., an automatic lane-changing, based on the sensing result.

As the vehicle moves on a city or a freeway, there is a requirement for the vehicle to change to a target lane for turning or leaving. However, conventional techniques all focus on space judgements, no optimal lane-changing decision considers both the time and the space, and an improvement is required.

SUMMARY

According to one aspect of the present disclosure, a decision system for changing lane includes a vehicle body, a detecting device and a controlling device. The detecting device is disposed at the vehicle body to detect at least one front vehicle speed, at least one front vehicle relative position and at least one front vehicle relative distance of at least one front vehicle, at least one rear vehicle speed, at least one rear vehicle relative position and at least one rear vehicle relative distance of at least one rear vehicle, a number of neighbor vehicles and at least one lane marking as a host vehicle moves on a lane. The controlling device is disposed at the vehicle body and signally connected to the detecting device. The controlling device includes a traffic flow sensing module, a time deciding module, a lane-changing type deciding module, a feasibility checking module, a decision making module and a decision exertion planning module. The traffic flow sensing module is configured for deciding whether a traffic flow status on a target lane is a low traffic flow, a medium traffic flow or a high traffic flow based on the at least one front vehicle speed, the at least one front vehicle relative position, the at least one front vehicle relative distance, the at least one rear vehicle speed, the at least one rear vehicle relative position, the at least one rear vehicle relative distance and the number of the neighbor vehicles. The time deciding module is configured for obtaining a lane-changing time point type based on a host vehicle current speed and a map. The lane-changing time point type includes a doable lane-changing time point flag and an immediate lane-changing time point flag. The lane-changing type deciding module is signally connected to the traffic flow sensing module and the time deciding module. The lane-changing type deciding module decides a lane-changing type based on the traffic flow sensing module and the time deciding module. The lane-changing type includes an unchanging flag, an advancing lane-changing flag and an immediate lane-changing flag. As the doable lane-changing time point flag is decided by the time deciding module and the traffic flow status is the medium traffic flow, the lane-changing type is the advancing lane-changing flag, and as the immediate lane-changing time point flag is decided by the time deciding module, the lane-changing type is the immediate lane-changing flag. The feasibility checking module is configured to check whether a lane-changing is feasible based on the host vehicle current speed, the at least one front vehicle speed, the at least one front vehicle relative position, the at least one front vehicle relative distance, the at least one rear vehicle speed, the at least one rear vehicle relative position, the at least one rear vehicle relative distance and the at least one lane marking. The decision making module is signally connected to the lane-changing type deciding module and the feasibility checking module to decide a decision type based on the lane-changing type and whether the lane-changing is feasible. The decision exertion planning module is signally connected to the decision making module for exerting a decision exerting plan based on the decision type. As the feasibility checking module checks that the lane-changing is feasible and the advancing lane-changing flag is decided by the lane-changing type deciding module, the decision type is an advancing lane-changing decision, and as the advancing lane-changing decision is output to the decision exertion planning module, the decision exerting plan includes a normal lane-changing path. As the feasibility checking module checks that the lane-changing is feasible and the immediate lane-changing flag is decided by the lane-changing type deciding module, the decision type is an immediate lane-changing decision, and as the immediate lane-changing decision is output to the decision exertion planning module, the decision exerting plan includes an positive lane-changing path.

According to another aspect of the present disclosure, a decision method for changing lane includes a detecting step, a traffic flow sensing step, a lane-changing time point type determining step, a lane-changing type deciding step, a feasibility checking step, a decision type making step and a decision exertion planning step. In the detecting step, a detecting device disposed at a vehicle body detects at least one front vehicle speed, at least one front vehicle relative position and at least one front vehicle relative distance of at least one front vehicle, at least one rear vehicle speed, at least one rear vehicle relative position and at least one rear vehicle relative distance of at least one rear vehicle, a number of neighbor vehicles and at least one lane marking as a host vehicle moves on a lane. In the traffic flow sensing step, a traffic flow sensing module disposed at the vehicle body decides whether a traffic flow status on a target lane is a low traffic flow, a medium traffic flow or a high traffic flow based on the at least one front vehicle speed, the at least one front vehicle relative position, the at least one front vehicle relative distance, the at least one rear vehicle speed, the at least one rear vehicle relative position, the at least one rear vehicle relative distance and the number of the neighbor vehicles. In the lane-changing time point type determining step, a time deciding module disposed at the vehicle body obtains a lane-changing time point type based on a host vehicle current speed and a map, and the lane-changing time point type includes a doable lane-changing time point flag and an immediate lane-changing time point flag. In the lane-changing type deciding step, a lane-changing type deciding module disposed at the vehicle body decides a lane-changing type based on the traffic flow sensing module and the time deciding module, the lane-changing type includes an unchanging flag, an advancing lane-changing flag and an immediate lane-changing flag, as the doable lane-changing time point flag is decided by the time deciding module and the traffic flow status is the medium traffic flow, the lane-changing type is the advancing lane-changing flag, and as the immediate lane-changing time point flag is decided by the time deciding module, the lane-changing type is the immediate lane-changing flag. In the feasibility checking step, a feasibility checking module disposed at the vehicle body checks whether a lane-changing is feasible based on the host vehicle current speed, the at least one front vehicle speed, the at least one rear vehicle speed and the at least one lane marking. In the decision type making step, a decision making module disposed at the vehicle body decides a decision type based on the lane-changing type and whether the lane-changing is feasible. In the decision exertion planning step, wherein a decision exertion planning module disposed at the vehicle body exerts a decision exerting plan based on the decision type. As the feasibility checking module checks that the lane-changing is feasible in the feasibility checking step and the advancing lane-changing flag is decided in the lane-changing type deciding step, the decision type making step decides that the decision type is an advancing lane-changing decision, and as the advancing lane-changing decision is output to the decision exertion planning module, the decision exerting plan includes a normal lane-changing path. As the feasibility checking module checks that the lane-changing is feasible in the feasibility checking step and the immediate lane-changing flag is decided in the lane-changing type deciding step, the decision type making step decides that the decision type is an immediate lane-changing decision, and as the immediate lane-changing decision is output to the decision exertion planning module, the decision exerting plan includes an positive lane-changing path.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
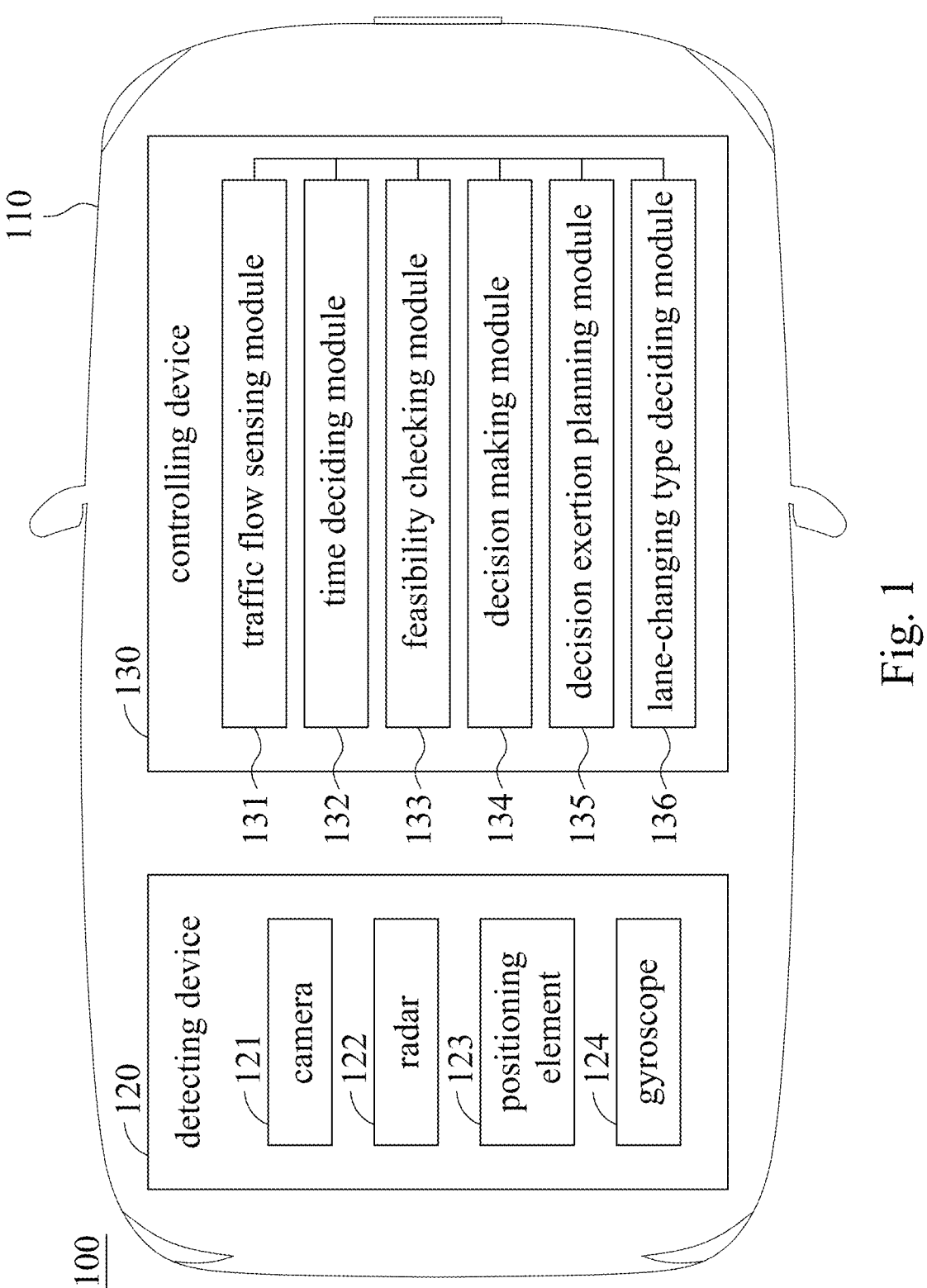
FIG. 1 is a block diagram of a decision system for changing lane according to an embodiment of the present disclosure.

The embodiments of the present disclosure will be illustrated with drawings hereinafter. In order to clearly describe the content, many practical details will be mentioned with the description hereinafter. However, it will be understood by the reader that the practical details will not limit the present disclosure. In other words, in some embodiment of the present disclosure, the practical details are not necessary. Additionally, in order to simplify the drawings, some conventional structures and elements will be illustrated in drawings in a simple way; the repeated elements may be labeled by the same or similar reference numerals.

In addition, the terms first, second, third, etc., are used herein to describe various elements or components, these elements or components should not be limited by these terms. Consequently, a first element or component discussed below could be termed a second element or component. Moreover, the combinations of the elements, the components, the mechanisms and the modules are not well-known, ordinary or conventional combinations, and whether the combinations can be easily completed by the one skilled in the art cannot be judged based on whether the elements, the components, the mechanisms or the module themselves are well-known, ordinary or conventional.

Figure 2:
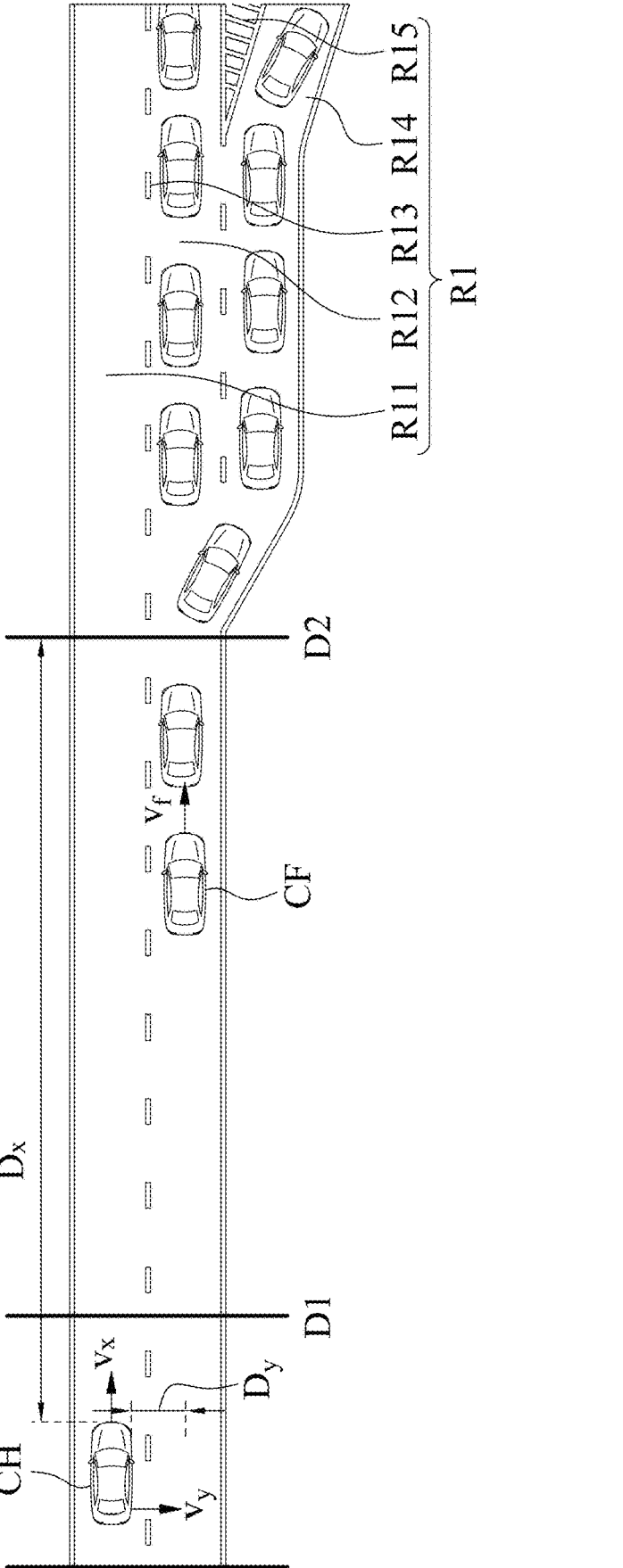
FIG. 2 is a first schematic view showing the decision system of FIG. 1 moving on a freeway.

FIG. 1 is a block diagram of a decision system 100 for changing lane according to an embodiment of the present disclosure. FIG. 2 is a first schematic view showing the decision system 100 of FIG. 1 moving on a freeway R1. The decision system 100 includes a vehicle body 110, a detecting device 120 and a controlling device 130.

The detecting device 120 is disposed at the vehicle body 110 to detect at least one front vehicle speed, at least one front vehicle relative position and at least one front vehicle relative distance of at least one front vehicle CF, at least one rear vehicle speed, at least one rear vehicle relative position and at least one rear vehicle relative distance of at least one rear vehicle CR (shown in FIG. 4), a number of neighbor vehicles and at least one lane marking R13 as a host vehicle CH moves on a lane R11.

The controlling device 130 is disposed at the vehicle body 110 and signally connected to the detecting device 120. The controlling device 130 includes a traffic flow sensing module 131, a time deciding module 132, a lane-changing type deciding module 136, a feasibility checking module 133, a decision making module 134 and a decision exertion planning module 135. The traffic flow sensing module 131 is configured for deciding whether a traffic flow status on a target lane (the lane R12) is a low traffic flow, a medium traffic flow or a high traffic flow based on the at least one front vehicle speed, the at least one front vehicle relative position, the at least one front vehicle relative distance, the at least one rear vehicle speed, the at least one rear vehicle relative position, the at least one rear vehicle relative distance and the number of the neighbor vehicles. The time deciding module 132 is configured for obtaining a lane-changing time point type based on a host vehicle current speed and a map. The lane-changing time point type includes a doable lane-changing time point flag and an immediate lane-changing time point flag. The lane-changing type deciding module 136 is signally connected to the traffic flow sensing module 131 and the time deciding module 132. The lane-changing type deciding module 136 decides a lane-changing type based on the traffic flow sensing module 131 and the time deciding module 132. The lane-changing type includes an unchanging flag, an advancing lane-changing flag and an immediate lane-changing flag. As the doable lane-changing time point flag is decided by the time deciding module 132 and the traffic flow status is the medium traffic flow, the lane-changing type is the advancing lane-changing flag, and as the immediate lane-changing time point flag is decided by the time deciding module 132, the lane-changing type is the immediate lane-changing flag. The feasibility checking module 133 is configured to check whether a lane-changing is feasible based on the host vehicle current speed, the at least one front vehicle speed, the at least one front vehicle relative position, the at least one front vehicle relative distance, the at least one rear vehicle speed, the at least one rear vehicle relative position, the at least one rear vehicle relative distance and the at least one lane marking R13.

The decision making module 134 is signally connected to the lane-changing type deciding module 136 and the feasibility checking module 133 to decide a decision type based on the lane-changing type and whether the lane-changing is feasible. The decision exertion planning module 135 is signally connected to the decision making module 134 for exerting a decision exerting plan based on the decision type. As the feasibility checking module 133 checks that the lane-changing is feasible and the advancing lane-changing flag is decided by the lane-changing type deciding module 136, the decision type is an advancing lane-changing decision, and as the advancing lane-changing decision is output to the decision exertion planning module 135, the decision exerting plan includes a normal lane-changing path. As the feasibility checking module 133 checks that the lane-changing is feasible and the immediate lane-changing flag is decided by the lane-changing type deciding module 136, the decision type is an immediate lane-changing decision, and as the immediate lane-changing decision is output to the decision exertion planning module 135, the decision exerting plan includes a positive lane-changing path.

Therefore, with the traffic flow sensing module 131 and the time deciding module 132, the lane-changing type deciding module 136 can decide the lane-changing type based on the traffic flow status on the target lane and the lane-changing time point type. Then the decision making module 134 may decide the decision type based on the lane-changing type and whether the lane-changing is feasible. Therefore, whether to conduct the normal lane-changing plan or the positive lane-changing plan can be decided.

The vehicle body 110 is the body of the host vehicle CH, and the decision system 100 may further include a power driving module, a braking module and a direction module disposed at the vehicle body 110. The driving module may include an engine, a gear box, a transmission shaft, a differential, etc., to transmit a power to move the vehicle body 110. The braking module may include a brake disc, a brake pad, etc., to generate a braking force for stopping the vehicle body 110. The power driving module or the braking module may obtain the host vehicle current speed. The direction module may include a steering wheel for changing a moving path of the vehicle body 110.

The detecting device 120 may include a camera 121, a radar 122, a positioning element 123 and a gyroscope 124. The positioning element 123 may be a global positioning system (GPS). The detecting device 120 can shoot images, detect objects and obtain the position of the host vehicle CH such as the longitude, latitude and the heading angle. The environment status and whether the front vehicle CF or the rear vehicle CR is present can be known from the detected result. Moreover, the front vehicle speed, the distance and the position of the front vehicle CF, the rear vehicle speed, the distance and the position of the rear vehicle CR and other relative information may also be obtained. The host vehicle current speed may also be obtained by the gyroscope 124. It is noted that, in other embodiments, the gyroscope may also be provided by the braking module, and the present disclosure is not limited thereto.

The controlling device 130 is the controlling center of the host vehicle CH.

The controlling device 130 may include a central processing unit (CPU), a microprocessor, a digital signal processor (DSP), a programmable controller, a programmable logic device (PLD) or other similar devices, or the combination thereof. The controlling device 130 is programed to form the traffic flow sensing module 131, the time deciding module 132, the lane-changing type deciding module 136, the feasibility checking module 133, the decision making module 134 and the decision exertion planning module 135 to conduct corresponding functions.

As shown in FIG. 2, the host vehicle CH is moving on the lane R11 (the inside lane) of the freeway R1, and the host vehicle CH has to enter a ramp R14; thus, the host vehicle CH has to change into the lane R12 (the outside lane) first before entering the ramp R14. The traffic flow sensing module 131 may judge the traffic flow status of the target lane, i.e., the low traffic flow, the medium traffic flow or the high traffic flow, based on the speed and the distance of the vehicles and the lane markings R13 in the environment, which can be taken into consideration for an advancing lane-changing. The low traffic flow represents that there are few vehicles on the target lane and the traffic is light. The high traffic flow represents that there are many vehicles on the target lane and the traffic is busy. The medium traffic flow is between the low traffic flow and the high traffic flow. It is noted that, in addition to the information detected by the detecting device 120, environment data from outer network devices may also be received by the controlling device 130 for the traffic flow sensing module 131 to judge the traffic flow status, but the present disclosure is not limited thereto.

The controlling device 130 may further include the map, or the map may be provided by the network devices wirelessly. The map is a high definition map including lots of precision information, such as markings (chevron markings R15, stopping lines, lane markings R13, etc.), signs, a number of the lanes R11, R12, etc., and thus with the cooperation of the positioning and the map, the position of the host vehicle CH on the map may be obtained.

Hence, the time deciding module 132 may obtain the distance between the current position and the ramp intersection based on the map, and obtain the lane-changing time point type with the cooperation of the host vehicle current speed of the host vehicle CH.

If the doable lane-changing time point flag is decided by the time deciding module 132, the current position of the host vehicle CH is within a section which allows changing lane, and the host vehicle CH can prepare to change lane. However, if the flow is light, the host vehicle CH may still stay in the current lane R11 and move for a certain distance before changing lane. Hence, the lane-changing type deciding module 136 may decide the lane-changing type, e.g., the unchanging flag or the advancing lane-changing flag, based on the doable lane-changing time point flag and the traffic flow status. In addition, even the lane-changing is exerted right now, it is not an emergency lane-changing. Therefore, the decision exertion planning module 135 may plan the normal lane-changing path based on a normal lateral acceleration. In other words, there is no need to change lane positively, and a lower lateral acceleration may be used to plan the normal lane-changing path.

On the contrary, the immediate lane-changing time point flag is decided by the time deciding module 132 because that after calculating based on the host vehicle current speed, if the host vehicle CH does not change lane immediately, the host vehicle CH is possible to miss the ramp R14 owing to that the host vehicle CH is not capable for changing lane. Hence, the immediate lane-changing flag is decided by the lane-changing type deciding module 136. In addition, since the host vehicle CH has to change lane positively, the decision exertion planning module 135 plans the positive lane-changing path based on an emergency lateral acceleration.

Precisely, the time deciding module 132 calculates an arriving time as the host vehicle CH arriving a ramp intersection or a road intersection based on the host vehicle current speed, a feasible lane-changing time as conducting the lane-changing based on a capability of the host vehicle CH, and a mandatory lane-changing time as conducting the lane-changing based on a mandatory lateral acceleration. The time deciding module 132 obtains a smallest one of the arriving time of the host vehicle CH and the feasible lane-changing time first, and then compares the smallest one and the mandatory lane-changing time to obtain a largest one thereof, thereby deciding whether the lane-changing time point type is the immediate lane-changing time point flag.

More precisely, the time deciding module 132 may calculate conditions of $t_{mode}=(2\times D_y/a_y)^{0.5}$, $t_{long}=D_x/v_x$ and $t_{lat}=D_y/v_y$. $a_y$ represents the mandatory lateral acceleration. $D_y$ represents a lateral distance between the host vehicle CH and the lane R12. $t_{mode}$ represents the mandatory lane-changing time. $D_x$ represents a longitudinal distance between the host vehicle CH and the ramp intersection or the road intersection, especial a distance between the host vehicle CH and a lane-changing prohibiting point D2 before the ramp intersection or the road intersection. $v_x$ represents a host vehicle longitudinal speed, i.e., a longitudinal vector of the host vehicle current speed. $t_{long}$ represents the arriving time of the host vehicle CH. $v_y$ represents a host vehicle lateral speed, i.e., a lateral vector of the host vehicle current speed. $t_{lat}$ represents the feasible lane-changing time. Consequently, a condition of $t_{max}=\max(t_{mode}, \min(t_{long}, t_{lat}))$ is calculated to obtain the largest one $t_{max}$.

Moreover, the time deciding module 132 calculates a necessary switchable distance based on the host vehicle current speed and a buffer distance, and if the longitudinal distance between the host vehicle CH and the lane-changing prohibiting point D2 is smaller than or equal to the necessary switchable distance, the immediate lane-changing time point flag is decided by the time deciding module 132. Hence, a condition of $t_{max}\times v_x+D_b$ is calculated, and $D_b$ represents the buffer distance. If a condition of $D_x \leq t_{max}\times v_x+D$ is satisfied, the immediate lane-changing time point flag is decided. Furthermore, the time deciding module 132 may include at least two butter default values that are different from each other, and any one of the at least two butter default values is served as the buffer distance. The butter default value may be 10 m or 50 m, and can be chosen by a driver or designed according to the speed. With increasing or decreasing the necessary switchable distance to change the judging time point of the immediate lane-changing time point flag, the positivity of the lane-changing can be adjusted. In other embodiments, a number of the butter default values may be larger than or equal to three, and the present disclosure is not limited thereto.

In addition to the doable lane-changing time point flag and the immediate lane-changing time point flag, the lane-changing time point type may further include a lane-changing giving up time point flag. In addition to the doable lane-changing flag and the immediate lane-changing flag, the lane-changing type may further include a lane-changing giving up flag. As the lane-changing giving up time point flag is decided by the time deciding module 132, the lane-changing type is the lane-changing giving up flag. Precisely, if the host vehicle CH cannot change lane successfully and exceeds the lane-changing prohibiting point D2, the decision making module 134 makes a lane-changing giving up decision, and the controlling device 130 redesigns the path.

The feasibility checking module 133 is configured to check whether the lane-changing is feasible. Precisely, the feasibility checking module 133 calculates a braking front relative speed shift between the host vehicle CH and the at least one front vehicle CF, a deceleration process front shift, a braking rear relative speed shift between the host vehicle CH and the at least one rear vehicle CR, a deceleration process rear shift, and a host vehicle responding time shift based on the host vehicle current speed, the at least one front vehicle speed and the at least one rear vehicle speed. If a sum of the braking front relative speed shift, the deceleration process front shift, the braking rear relative speed shift, the deceleration process rear shift and two times the host vehicle responding time shift is larger than or equal to a length L (shown in FIG. 4) of the vehicle body 110, the feasibility checking module 133 decides that the lane-changing is feasible.

Specifically, the feasibility checking module 133 checks whether the lane-changing is feasible based on checking whether a drivable space is present. The feasibility checking module 133 may calculates conditions (1) and (2).

$$S_f = \text{abs}\left((v_x - v_f)\times t_b + (v_x - v_f)^2/a + v_x \times t_g\right). \tag{1}$$

$$S_r = \text{abs}\left((v_x - v_r)\times t_b + (v_x - v_r)^2/a + v_x \times t_g\right). \tag{2}$$

$v_f$ represents a front vehicle longitudinal speed, i.e., a longitudinal vector of the front vehicle speed. $v_r$ (shown in FIG. 4) represents a rear vehicle longitudinal speed, i.e., a longitudinal vector of the rear vehicle speed. $t_b$ represent a sliding time. $(v_x-v_f)$ represents a front vehicle relative speed. $(v_x-v_r)$ represents a rear vehicle relative speed. $(v_x-v_f)\times t_b$ and $(v_x-v_r)\times t_b$ respectively represent the braking front relative speed shift and the braking rear relative speed shift. $a$ represents a maximum deceleration, i.e., a mandatory deceleration in a non-emergency situation, which may be equal to 3 m/s$^2$ as the host vehicle CH is closing. Hence, $(v_x-v_f)^2/a$ and $(v_x-v_r)^2/a$ respectively represents the deceleration process front shift and the deceleration process rear shift. $t_g$ represents the system responding time, and thus $v_x\times t_g$ represents the host vehicle responding time shift of the host vehicle CH. $S_f$ (shown in FIG. 4) represents the front distance, especially representing a longitudinal distance between a front end of the host vehicle CH and a rear end of the front vehicle CF. $S_r$ (shown in FIG. 4) represents the rear distance, especially representing a longitudinal distance between a rear end of the host vehicle CH and a front end of the rear vehicle CR. L represents the length of the vehicle body 110. If a condition of $L \leq S_f+S_r$ is satisfied, the drivable space is present, and the lane-changing is feasible. It is noted that, the front vehicle CF and the host vehicle CR are the vehicles on the target lane, and as the front end of the rear vehicle CR exceeds the rear end of the host vehicle CH or no rear vehicle CR is present, $S_r=0$.

In the present disclosure, after the decision making module 134 decides the decision type based on the lane-changing type and whether the lane-changing is feasible, the decision exertion planning module 135 conducts the decision exerting plan according to different switching positivity. For example, different lateral accelerations, different gas pedal plans or different braking plan may be used to calculate a specific inserting space, and then the lane-changing can be exerted. The specific inserting space with high switching positivity is usually smaller than the specific inserting space with low switching positivity. However, if the decision type made by the decision making module 134 is to change lane, the host vehicle CH may be incapable of changing lane owing to the limitations of different modules or mechanisms or the limitation of the regulations. Hence, in the present disclosure, the situation that the decision making module 134 judges that the lane-changing is feasible but the decision exertion planning module 135 cannot successfully change lane may be happened, thereby missing the ramp intersection or the road intersection.

Figure 3:
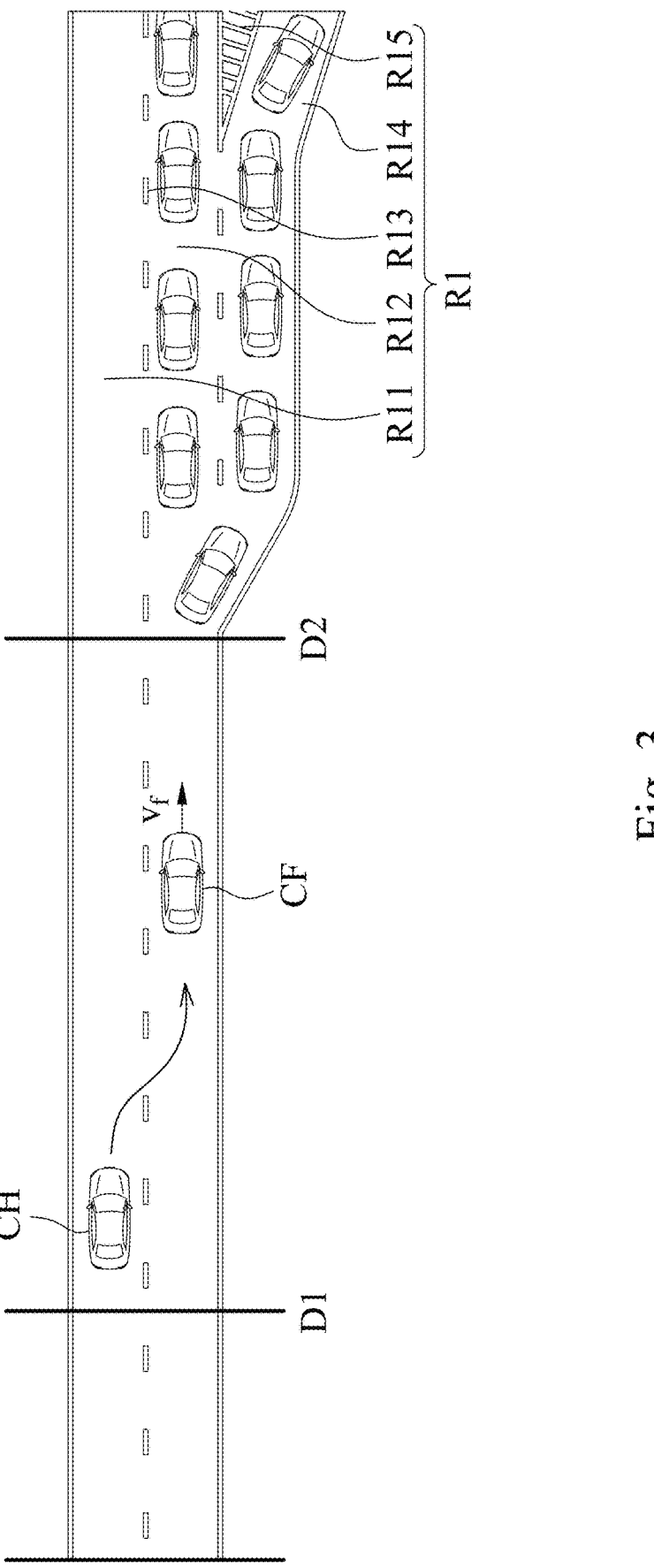
FIG. 3 is a second schematic view showing the decision system of FIG. 1 moving on the freeway.
Figure 4:
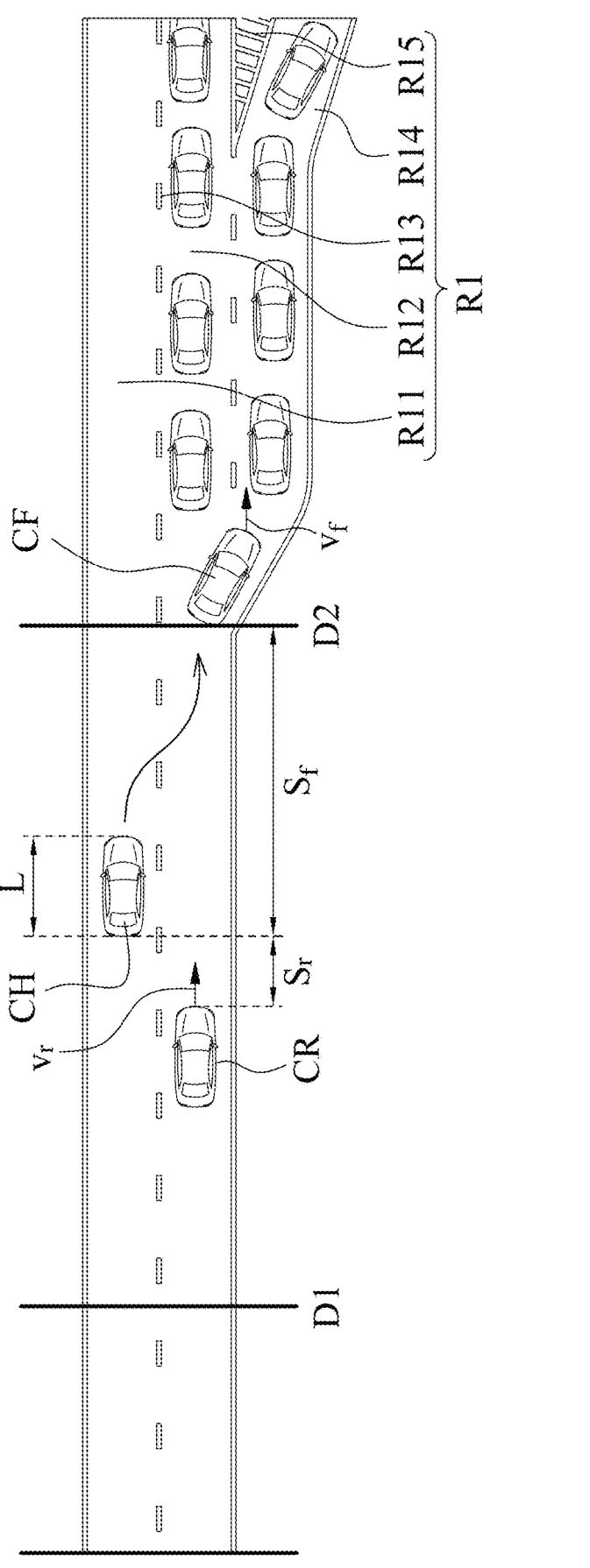
FIG. 4 is a third schematic view showing the decision system of FIG. 1 moving on the freeway.
Figure 5:
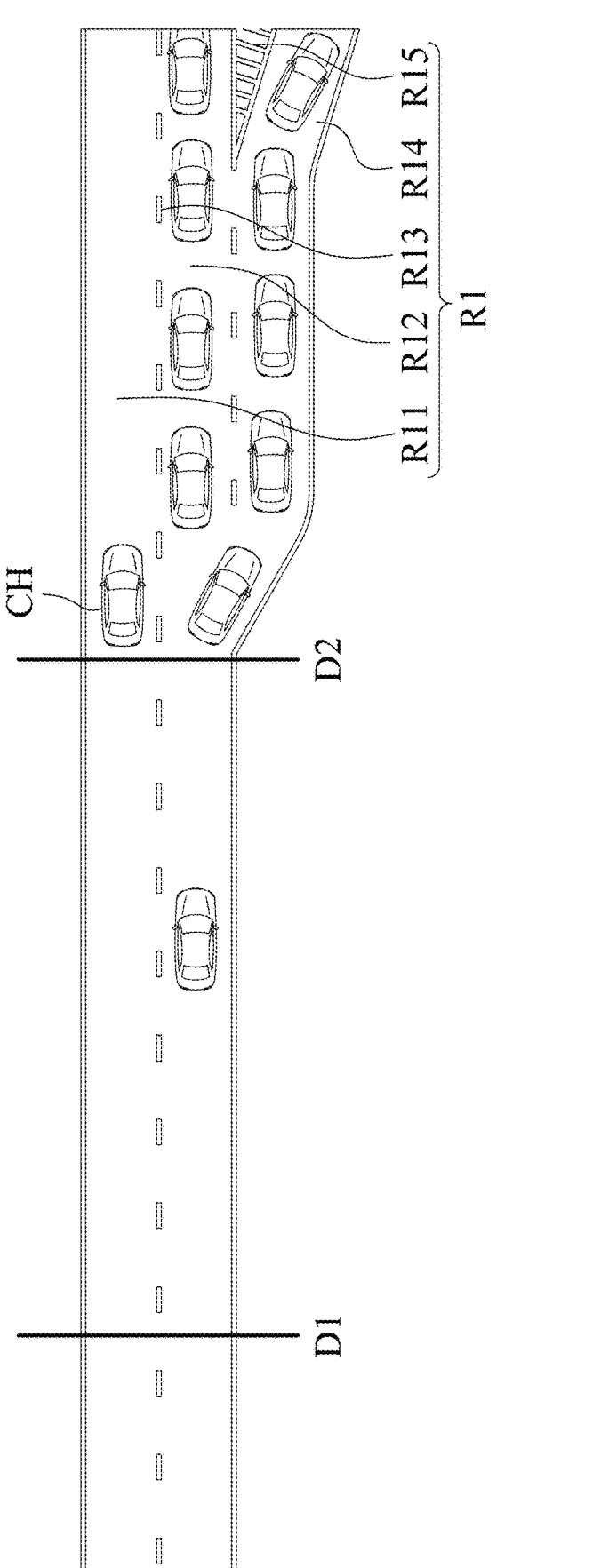
FIG. 5 is a fourth schematic view showing the decision system of FIG. 1 moving on the freeway.

FIG. 3 is a second schematic view showing the decision system 100 of FIG. 1 moving on the freeway R1. FIG. 4 is a third schematic view showing the decision system 100 of FIG. 1 moving on the freeway R1. FIG. 5 is a fourth schematic view showing the decision system 100 of FIG. 1 moving on the freeway R1. As shown in FIG. 2 to FIG. 5, a lane-changing allowance point D1 may correspond to a switchable sign on the freeway R1, and the lane-changing prohibiting point D2 may be a position 300*m* away from the chevron line R15 because in the regulation the vehicles cannot change lane after the position 300*m* away from the chevron line R15. The decision system 100 may be described in more details with the relations of the traffic flow status, the lane-changing time point type and the lane-changing type of Table 1.

decided by the time deciding module 132. If the low traffic flow is decided by the traffic flow sensing module 131, the unchanging flag is decided by the lane-changing type deciding module 136, and the host vehicle CH remains moving on the lane R11. If the medium traffic flow is decided by the traffic flow sensing module 131, the advancing lane-changing flag is decided by the lane-changing type deciding module 136. Hence, as the feasibility checking module 133 decides that the lane-changing is feasible based on the condition of $L \leq S_f + S_r$, the decision making module 134 decides the advancing lane-changing decision owing to that the lane-changing type is the advancing lane-changing flag, and the decision exertion planning module 135 conducts the decision exerting plan including the normal lane-changing path. On the contrary, if the high traffic flow is decided by the traffic flow sensing module 131, the immediate lane-changing flag is decided by the lane-changing type deciding module 136. Hence, as the feasibility checking module 133 decides that the lane-changing is feasible based on the condition of $L \leq S_f + S_r$, the decision making module 134 decides the immediate lane-changing decision owing to that the lane-changing type is the immediate lane-changing flag, and the decision exertion planning module 135 conducts the decision exerting plan including the positive lane-changing path.

As shown in FIG. 4 and Table, 1, the host vehicle CH moves on the lane R11 and is near the lane-changing

TABLE 1

| | no time point flag | doable lane-changing time point flag | immediate lane-changing time point flag | lane-changing giving up time point |
|---|---|---|---|---|
| high traffic flow | advancing lane-changing flag | immediate lane-changing flag | immediate lane-changing flag | lane-changing giving up flag |
| medium traffic flow | advancing lane-changing flag | advancing lane-changing flag | immediate lane-changing flag | lane-changing giving up flag |
| low traffic flow | unchanging flag | unchanging flag | immediate lane-changing flag | lane-changing giving up flag |

As shown in FIG. 2 and Table 1, the host vehicle CH moves on the lane R11 and does not pass the lane-changing allowance point D1, including a position which is far away from the lane-changing allowance point D1. At this time, no time point flag is decided, that is, the lane-changing time point type being not the doable lane-changing time point flag, the immediate lane-changing time point flag or the lane-changing giving up time point flag. If the low traffic flow is decided by the traffic flow sensing module 131, the unchanging flag is decided by the lane-changing type deciding module 136. On the contrary, if the high traffic flow or the medium traffic flow is decided by the traffic flow sensing module 131, the advancing lane-changing flag is decided by the lane-changing type deciding module 136. Hence, if the feasibility checking module 133 decides that the lane-changing is feasible based on the condition of $L \leq S_f + S_r$, the decision making module 134 decides the advancing lane-changing decision, and the decision exertion planning module 135 conducts the decision exerting plan including the normal lane-changing path.

As shown in FIG. 3 and Table 1, the host vehicle CH moves on the lane R11 and passes the lane-changing allowance point D1 but is not near the lane-changing prohibiting point D2. The doable lane-changing time point flag is prohibiting point D2, that is, the condition of $D_x \leq t_{max} \times v_x + D_b$ being satisfied. The immediate lane-changing time point flag is decided by the time deciding module 132. At this time, no matter how the traffic flow status is, the immediate lane-changing flag is decided by the lane-changing type deciding module 136. As the feasibility checking module 133 decides that the lane-changing is feasible, the decision making module 134 decides the immediate lane-changing decision, and the decision exertion planning module 135 conducts the decision exerting plan including the positive lane-changing path.

As the host vehicle CH passes the lane-changing prohibiting point D2, the lane-changing giving up time point flag is decided by the time deciding module 132, the lane-changing giving up flag is decided by the lane-changing type deciding module 136, the lane-changing giving up decision is decided by the decision making module 134, and the lane-changing is not exerted. After which, because the ramp R14 is missed, the controlling device 130 redesigns the path.

It is noted that, although the host vehicle CH in FIGS. 2 to 5 is illustrated to enter the ramp R14 (off-ramp) of the freeway R1, the decision system 100 may also be used in entering an on-ramp of the freeway R1 or turning at the road intersection. The present disclose is not limited thereto.

Figure 6:
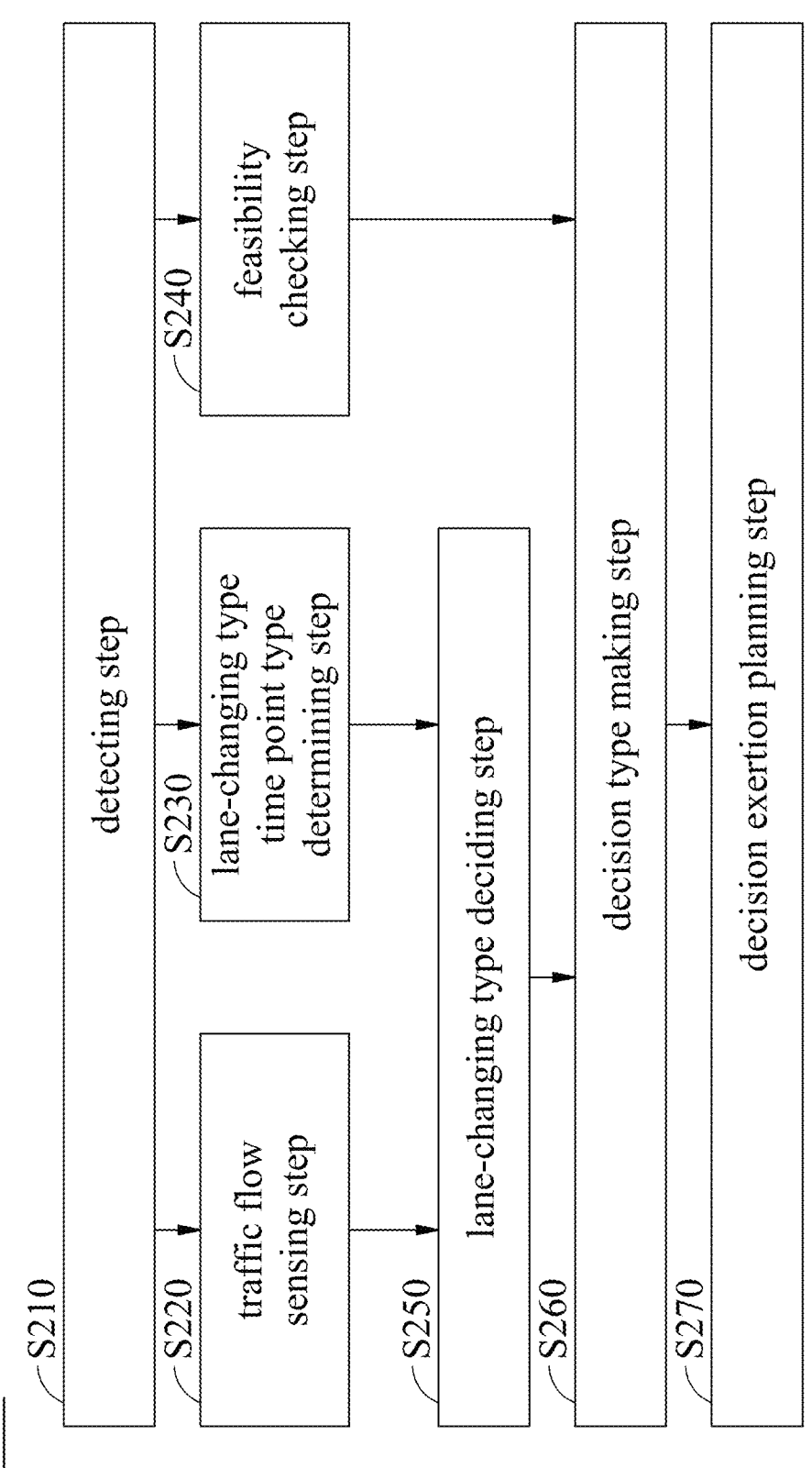
FIG. 6 is a block flow chart of a decision method for changing lane according to another embodiment of the present disclosure.

Please refer to FIG. 6 with references of FIGS. 1 to 5, and FIG. 6 is a block flow chart of a decision method S200 for changing lane according to another embodiment of the present disclosure. The decision method S200 includes a detecting step S210, a traffic flow sensing step S220, a lane-changing time point type determining step S230, a lane-changing type deciding step S250, a feasibility checking step S240, a decision type making step S260 and a decision exertion planning step S270. The details of the decision method S200 will be described with the decision system 100 in FIGS. 1 to 5.

In the detecting step S210, the detecting device 120 disposed at the vehicle body 110 detects the at least one front vehicle speed, the at least one front vehicle relative position, the at least one front vehicle relative distance, the at least one rear vehicle speed, the at least one rear vehicle relative position, the at least one rear vehicle relative distance, the number of neighbor vehicles and the at least one lane marking R13 as the host vehicle CH moves on the lane R11.

In the traffic flow sensing step S220, the traffic flow sensing module 131 disposed at the vehicle body 110 decides whether the traffic flow status on the target lane is the low traffic flow, the medium traffic flow or the high traffic flow based on the at least one front vehicle speed, the at least one front vehicle relative position, the at least one front vehicle relative distance, the at least one rear vehicle speed, the at least one rear vehicle relative position, the at least one rear vehicle relative distance, and the number of the neighbor vehicles.

In the lane-changing time point type determining step S230, the time deciding module 132 disposed at the vehicle body 110 obtains the lane-changing time point type based on the host vehicle current speed and the map, and the lane-changing time point type includes the doable lane-changing time point flag and the immediate lane-changing time point flag.

In the lane-changing type deciding step S250, the lane-changing type deciding module 136 disposed at the vehicle body 110 decides the lane-changing type based on the traffic flow sensing module 131 and the time deciding module 132, the lane-changing type includes the unchanging flag, the advancing lane-changing flag and the immediate lane-changing flag. As the doable lane-changing time point flag is decided by the time deciding module 132 and the traffic flow status is the medium traffic flow, the lane-changing type is the advancing lane-changing flag. As the immediate lane-changing time point flag is decided by the time deciding module 132, the lane-changing type is the immediate lane-changing flag.

In the feasibility checking step S240, the feasibility checking module 133 disposed at the vehicle body 110 checks whether the lane-changing is feasible based on the host vehicle current speed, the at least one front vehicle speed, the at least one rear vehicle speed and the at least one lane marking R13.

In the decision type making step S260, the decision making module 134 disposed at the vehicle body 110 decides the decision type based on the lane-changing type and whether the lane-changing is feasible.

In the decision exertion planning step S270, the decision exertion planning module 135 disposed at the vehicle body 110 exerts the decision exerting plan based on the decision type. As the feasibility checking module 133 checks that the lane-changing is feasible in the feasibility checking step S240 and the advancing lane-changing flag is decided in the lane-changing type deciding step S250, the decision type making step S260 decides that the decision type is an advancing lane-changing decision, and as the advancing lane-changing decision is output to the decision exertion planning module 135, the decision exerting plan includes the normal lane-changing path. As the feasibility checking module 133 checks that the lane-changing is feasible in the feasibility checking step S240 and the immediate lane-changing flag is decided in the lane-changing type deciding step S250, the decision type making step S260 decides that the decision type is the immediate lane-changing decision, and as the immediate lane-changing decision is output to the decision exertion planning module 135, the decision exerting plan includes the positive lane-changing path.

Precisely, in the detecting step S210, parameters such as objects, speeds, positions, distances, etc., can be detected by the detecting device 120 and be provided to other modules. In the traffic flow sensing step S220, the traffic flow sensing module 131 may judge the traffic flow status of the target lane, i.e., the low traffic flow, the medium traffic flow or the high traffic flow, based on the speed and the distance of the vehicles and the lane markings R13 in the environment, which can be taken into consideration for whether to conduct an advancing lane-changing.

In the lane-changing time point type determining step S230, the distance between the current position and the ramp intersection may be obtained based on the map, and the lane-changing time point type may be obtained with the cooperation of the host vehicle current speed of the host vehicle CH, which may be taken into consideration in the lane-changing type deciding step S250 for deciding the lane-changing type. Furthermore, as the doable lane-changing time point flag is decided by the time deciding module 132, if the traffic flow status is the high traffic flow, the immediate lane-changing flag is decided in the lane-changing type deciding step S250. If the traffic flow status is the low traffic flow, the unchanging flag is decided in the lane-changing type deciding step S250. In addition, the lane-changing time point type further includes the lane-changing giving up time point flag, the lane-changing type may further include the lane-changing giving up flag. As the lane-changing giving up time point flag is decided by the time deciding module 132, the lane-changing type deciding step S250 decides that the lane-changing type is the lane-changing giving up flag.

Additionally, in the lane-changing time point type determining step S230, the time deciding module 132 calculates the arriving time as the host vehicle CH arriving the ramp intersection or the road intersection based on the host vehicle current speed, the feasible lane-changing time as conducting the lane-changing based on the capability of the host vehicle CH, and the mandatory lane-changing time as conducting the lane-changing based on the mandatory lateral acceleration, the time deciding module 132 obtains the smallest one of the arriving time of the host vehicle CH and the feasible lane-changing time first, and then compares the smallest one and the mandatory lane-changing time to obtain the largest one thereof, thereby deciding whether the lane-changing time point type is the immediate lane-changing time point flag. The details are as the aforementioned and will not be repeated.

The lane-changing type deciding step S250 may decide the lane-changing type based on Table 1. Therefore, the unchanging flag, the advancing lane-changing flag, the immediate lane-changing flag and the lane-changing giving up flag may be decided by different situations.

In the feasibility checking step S240, the feasibility checking module 133 calculates the braking front relative speed shift between the host vehicle CH and the at least one front vehicle CF, the deceleration process front shift, the braking rear relative speed shift between the host vehicle CH and the at least one rear vehicle CR, the deceleration process rear shift, and the host vehicle responding time shift based on the host vehicle current speed, the at least one front vehicle speed and the at least one rear vehicle speed. If the sum of the braking front relative speed shift, the deceleration process front shift, the braking rear relative speed shift, the deceleration process rear shift and two times the host vehicle responding time shift is larger than or equal to the length L of the vehicle body 110, the feasibility checking module 133 decides that the lane-changing is feasible. In other words, the feasibility checking module 133 calculates the conditions (1) and (2) and judge whether the drivable space is present based on the condition of $L \leq S_f + S_r$, thereby checking whether the lane-changing is feasible.

Figure 7:
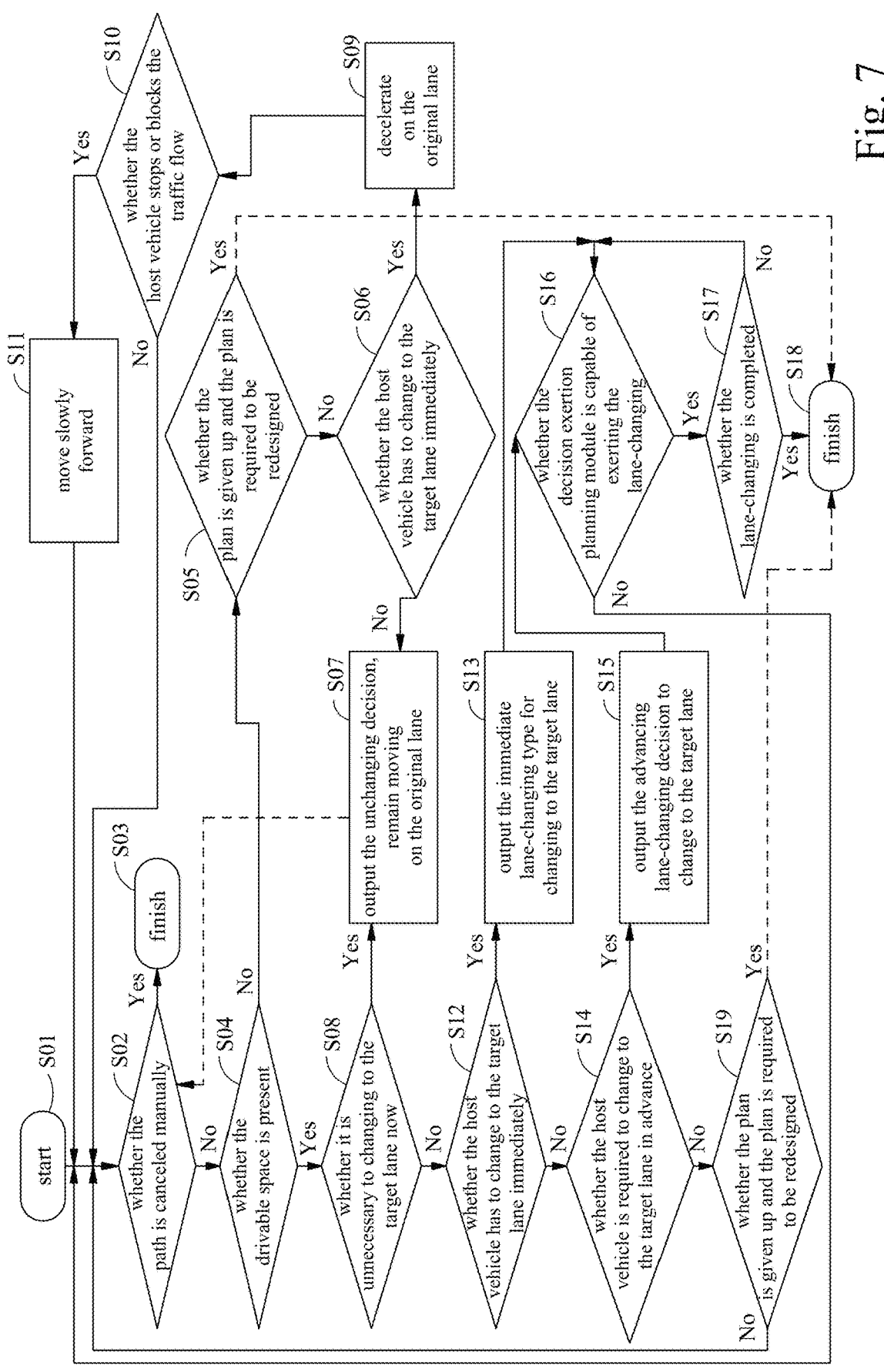
FIG. 7 is a step flow chart of the decision method of FIG. 6.

FIG. 7 is a step flow chart of the decision method S200 of FIG. 6. As shown in FIGS. 1 to 6, in Step S01 the decision method S200 starts. The host vehicle CH can automatically move on the freeway R1 according to the path decided by the navigation, and the host vehicle CH is going to enter the ramp R14. After which, Step S02 is exerted to confirm whether the path is canceled by the driver, that is, whether the plan of entering the ramp R14 is canceled. If yes, Step S03 is exerted to finish the decision method S200. If not, Step S04 is exerted to check whether the drivable space is present. If Step S04 checks that the drivable space is present, Step S08 is exerted to check whether it is unnecessary to change to the target lane (the lane R12).

If Step S08 confirms that it is unnecessary to change to the target lane, Step S07 is exerted, the decision type making step S260 outputs the unchanging decision, the host vehicle CH remains moving on the original lane (the lane R11), and Step S02 is resumed. For example, as shown in FIG. 2, the host vehicle CH moves on the lane R11 and does not pass the lane-changing allowance point D1, if the low traffic flow is decided by the traffic flow sensing module 131, the unchanging flag is decided by the lane-changing type deciding step S250, and Step S08 confirms that it is unnecessary to change to the target lane.

On the contrary, if Step S08 confirms that it is necessary to change to the target lane, Step S12 is exerted to confirm whether the host vehicle CH has to change to the target lane immediately, that is, confirming whether the immediate lane-changing flag is decided. If the immediate lane-changing flag is decided, Step S13 is exerted, and the decision type making step S260 outputs the immediate lane-changing type for changing to the target lane. After which, Step S16 is exerted to confirm whether the decision exertion planning module 135 is capable of exerting the lane-changing. If yes, Step S17 is exerted to confirm whether the lane-changing is completed, Step S18 is exerted as the lane-changing is completed, and S16 is resumed as the lane-changing is not completed. If Step S16 confirms that the decision exertion planning module 135 is incapable of exerting the lane-changing, Step S02 is resumed.

If Step S12 confirms that the host vehicle CH does not need to change to the target lane immediately, Step S14 is exerted to confirm whether the host vehicle CH is required to change to the target lane in advance, that is, confirming whether the advancing lane-changing flag is decided. If the advancing lane-changing flag is decided, Step S15 is exerted, and the decision type making step S260 outputs the advancing lane-changing decision to change to the target lane. After which, Step S16 is exerted. Steps S16, S17, S18 are as aforementioned, and will not be repeated.

If Step S14 confirms that the host vehicle CH is not required to change to the target lane in advance, Step S19 is exerted to confirm whether the plan is given up and the plan is required to be redesigned, that is, confirming whether the lane-changing giving up flag is decided. If the lane-changing giving up flag is decided, Step S18 is exerted to finish the decision method S200. If the lane-changing giving up flag is not decided, Step S02 is resumed.

If Step S04 checks that the drivable space is not present, Step S05 is exerted to confirm whether the plan is given up and the plan is required to be redesigned, that is, confirming whether the lane-changing giving up flag is decided. If yes, Step S18 is exerted to finish the decision method S200. If not, Step S06 is exerted to confirm whether the host vehicle CH has to change to the target lane immediately. If Step S06 judges that the host vehicle CH does not have to change to the target lane immediately, Step S07 is exerted. If Step S06 judges that the host vehicle CH has to change to the target lane immediately, Step S09 is exerted, the host vehicle CH remains moving on the original lane to wait for the chance for changing lane. After which, Step S10 is exerted to confirm whether the host vehicle CH stops or blocks the traffic flow. If the host vehicle CH does not stop or block the traffic flow, Step S02 is resumed. If the host vehicle CH stops or blocks the traffic flow, Step S11 is exerted, the host vehicle CH moves slowly forward, and Step S02 is resumed.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A decision system for changing lane, comprising:
a vehicle body;
a detecting device disposed at the vehicle body to detect at least one front vehicle speed, at least one front vehicle relative position and at least one front vehicle relative distance of at least one front vehicle, at least one rear vehicle speed, at least one rear vehicle relative position and at least one rear vehicle relative distance of at least one rear vehicle, a number of neighbor vehicles and at least one lane marking as a host vehicle moves on a lane; and
a controlling device disposed at the vehicle body and signally connected to the detecting device, the controlling device comprising:
a traffic flow sensing module configured for deciding whether a traffic flow status on a target lane is a low traffic flow, a medium traffic flow or a high traffic flow based on the at least one front vehicle speed, the at least one front vehicle relative position, the at least one front vehicle relative distance, the at least one rear vehicle speed, the at least one rear vehicle relative position, the at least one rear vehicle relative distance and the number of the neighbor vehicles;
a time deciding module configured for obtaining a lane-changing time point type based on a host vehicle current speed and a map, wherein the lane-changing time point type comprises a doable lane-changing time point flag and an immediate lane-changing time point flag;

a lane-changing type deciding module signally connected to the traffic flow sensing module and the time deciding module, the lane-changing type deciding module deciding a lane- changing type based on the traffic flow sensing module and the time deciding module, wherein the lane-changing type comprises an unchanging flag, an advancing lane-changing flag and an immediate lane-changing flag, as the doable lane-changing time point flag is decided by the time deciding module and the traffic flow status is the medium traffic flow, the lane-changing type is the advancing lane-changing flag, and as the immediate lane-changing time point flag is decided by the time deciding module, the lane-changing type is the immediate lane-changing flag;

a feasibility checking module configured to check whether a lane-changing is feasible based on the host vehicle current speed, the at least one front vehicle speed, the at least one front vehicle relative position, the at least one front vehicle relative distance, the at least one rear vehicle speed, the at least one rear vehicle relative position, the at least one rear vehicle relative distance and the at least one lane marking;

a decision making module signally connected to the lane-changing type deciding module and the feasibility checking module to decide a decision type based on the lane-changing type and whether the lane-changing is feasible; and a decision exertion planning module signally connected to the decision making module for exerting a decision exerting plan based on the decision type;

wherein as the feasibility checking module checks that the lane-changing is feasible and the advancing lane-changing flag is decided by the lane-changing type deciding module, the decision type is an advancing lane-changing decision, and as the advancing lane-changing decision is output to the decision exertion planning module, the decision exerting plan includes a normal lane-changing path, and the vehicle body is controlled to move to the target lane; as the feasibility checking module checks that the lane-changing is feasible and the immediate lane-changing flag is decided by the lane-changing type deciding module, the decision type is an immediate lane-changing decision, and as the immediate lane-changing decision is output to the decision exertion planning module, the decision exerting plan includes an positive lane-changing path, and the vehicle body is controlled to move to the target lane.

2. The decision system of claim 1, wherein as the doable lane-changing time point flag is decided by the time deciding module, if the traffic flow status is the high traffic flow, the immediate lane-changing flag is decided by the lane-changing type deciding module.

3. The decision system of claim 1, wherein the lane-changing time point type further comprises a lane-changing giving up time point flag, the lane-changing type further comprises a lane-changing giving up flag, and as the lane-changing giving up time point flag is decided by the time deciding module, the lane-changing type is the lane-changing giving up flag.

4. The decision system of claim 1, wherein the time deciding module calculates an arriving time as the host vehicle arriving a ramp intersection or a road intersection based on the host vehicle current speed, a feasible lane-changing time as conducting the lane-changing based on a capability of the host vehicle, and a mandatory lane-changing time as conducting the lane-changing based on a mandatory lateral acceleration, the time deciding module obtains a smallest one of the arriving time of the host vehicle and the feasible lane-changing time first, and then compares the smallest one and the mandatory lane-changing time to obtain a largest one thereof, thereby deciding whether the lane-changing time point type is the immediate lane-changing time point flag.

5. The decision system of claim 1, wherein as the doable lane-changing time point flag is decided by the time deciding module, if the traffic flow status is the low traffic flow, the lane-changing type is the unchanging flag, and the decision type is an unchanging decision.

6. The decision system of claim 1, wherein the feasibility checking module calculates a braking front relative speed shift between the host vehicle and the at least one front vehicle, a deceleration process front shift, a braking rear relative speed shift between the host vehicle and the at least one rear vehicle, a deceleration process rear shift, and a host vehicle responding time shift based on the host vehicle current speed, the at least one front vehicle speed and the at least one rear vehicle speed, and if a sum of the braking front relative speed shift, the deceleration process front shift, the braking rear relative speed shift, the deceleration process rear shift and two times the host vehicle responding time shift is larger than or equal to a length of the vehicle body, the feasibility checking module decides that the lane-changing is feasible.

7. The decision system of claim 1, wherein the decision exertion planning module plans the normal lane-changing path based on a normal lateral acceleration, and plans the positive lane-changing path based on an emergency lateral acceleration.

8. The decision system of claim 1, wherein the time deciding module calculates a necessary switchable distance based on the host vehicle current speed and a buffer distance, and if a longitudinal distance between the host vehicle and a lane-changing prohibiting point is smaller than or equal to the necessary switchable distance, the immediate lane-changing time point flag is decided by the time deciding module.

9. The decision system of claim 8, wherein the time deciding module comprises at least two butter default values that are different from each other, and any one of the at least two butter default values is served as the buffer distance.

10. A decision method for changing lane, comprising:

a detecting step, wherein a detecting device disposed at a vehicle body detects at least one front vehicle speed, at least one front vehicle relative position and at least one front vehicle relative distance of at least one front vehicle, at least one rear vehicle speed, at least one rear vehicle relative position and at least one rear vehicle relative distance of at least one rear vehicle, a number of neighbor vehicles and at least one lane marking as a host vehicle moves on a lane;

a traffic flow sensing step, wherein a traffic flow sensing module disposed at the vehicle body decides whether a traffic flow status on a target lane is a low traffic flow, a medium traffic flow or a high traffic flow based on the at least one front vehicle speed, the at least one front vehicle relative position, the at least one front vehicle relative distance, the at least one rear vehicle speed, the at least one rear vehicle relative position, the at least one rear vehicle relative distance and the number of the neighbor vehicles;

a lane-changing time point type determining step, wherein a time deciding module disposed at the vehicle body obtains a lane-changing time point type based on a host vehicle current speed and a map, and the lane-changing time point type comprises a doable lane-changing time point flag and an immediate lane-changing time point flag;

a lane-changing type deciding step, wherein a lane-changing type deciding module disposed at the vehicle body decides a lane-changing type based on the traffic flow sensing module and the time deciding module, the lane-changing type comprises an unchanging flag, an advancing lane-changing flag and an immediate lane-changing flag, as the doable lane-changing time point flag is decided by the time deciding module and the traffic flow status is the medium traffic flow, the lane-changing type is the advancing lane-changing flag, and as the immediate lane-changing time point flag is decided by the time deciding module, the lane-changing type is the immediate lane-changing flag;

a feasibility checking step, wherein a feasibility checking module disposed at the vehicle body checks whether a lane-changing is feasible based on the host vehicle current speed, the at least one front vehicle speed, the at least one rear vehicle speed and the at least one lane marking;

a decision type making step, wherein a decision making module disposed at the vehicle body decides a decision type based on the lane-changing type and whether the lane-changing is feasible; and a decision exertion planning step, wherein a decision exertion planning module disposed at the vehicle body exerts a decision exerting plan based on the decision type;

wherein as the feasibility checking module checks that the lane-changing is feasible in the feasibility checking step and the advancing lane-changing flag is decided in the lane-changing type deciding step, the decision type making step decides that the decision type is an advancing lane-changing decision, and as the advancing lane-changing decision is output to the decision exertion planning module, the decision exerting plan includes a normal lane-changing path, and the vehicle body is controlled to move to the target lane; as the feasibility checking module checks that the lane-changing is feasible in the feasibility checking step and the immediate lane-changing flag is decided in the lane-changing type deciding step, the decision type making step decides that the decision type is an immediate lane-changing decision, and as the immediate lane-changing decision is output to the decision exertion planning module, the decision exerting plan includes an positive lane-changing path, and the vehicle body is controlled to move to the target lane.

11. The decision method of claim 10, wherein as the doable lane-changing time point flag is decided by the time deciding module, if the traffic flow status is the high traffic flow, the immediate lane-changing flag is decided in the lane-changing type deciding step.

12. The decision method of claim 10, wherein the lane-changing time point type further comprises a lane-changing giving up time point flag, the lane-changing type further comprises a lane-changing giving up flag, and as the lane-changing giving up time point flag is decided by the time deciding module, the lane-changing type deciding step decides that the lane-changing type is the lane-changing giving up flag.

13. The decision method of claim 10, wherein in the lane-changing time point type determining step, the time deciding module calculates an arriving time as the host vehicle arriving a ramp intersection or a road intersection based on the host vehicle current speed, a feasible lane-changing time as conducting the lane-changing based on a capability of the host vehicle, and a mandatory lane-changing time as conducting the lane-changing based on a mandatory lateral acceleration, the time deciding module obtains a smallest one of the arriving time of the host vehicle and the feasible lane-changing time first, and then compares the smallest one and the mandatory lane-changing time to obtain a largest one thereof, thereby deciding whether the lane-changing time point type is the immediate lane-changing time point flag.

14. The decision method of claim 10, wherein as the doable lane-changing time point flag is decided by the time deciding module, if the traffic flow status is the low traffic flow, the lane-changing type deciding step decides that the lane-changing type is the unchanging flag, and the decision deciding step decides that the decision type is an unchanging decision.

15. The decision method of claim 10, wherein in the feasibility checking step, the feasibility checking module calculates a braking front relative speed shift between the host vehicle and the at least one front vehicle, a deceleration process front shift, a braking rear relative speed shift between the host vehicle and the at least one rear vehicle, a deceleration process rear shift, and a host vehicle responding time shift based on the host vehicle current speed, the at least one front vehicle speed and the at least one rear vehicle speed, and if a sum of the braking front relative speed shift, the deceleration process front shift, the braking rear relative speed shift, the deceleration process rear shift and two times the host vehicle responding time shift is larger than or equal to a length of the vehicle body, the feasibility checking module decides that the lane-changing is feasible.

16. The decision method of claim 10, wherein in the decision exertion planning step, the decision exertion planning module plans the normal lane-changing path based on a normal lateral acceleration, and plans the positive lane-changing path based on an emergency lateral acceleration.

17. The decision method of claim 10, wherein in the lane-changing time point type determining step, the time deciding module calculates a necessary switchable distance based on the host vehicle current speed and a buffer distance, and if a longitudinal distance between the host vehicle and a lane-changing prohibiting point is smaller than or equal to the necessary switchable distance, the immediate lane-changing time point flag is decided by the time deciding module.

18. The decision method of claim 17, wherein in the lane-changing time point type determining step, the time deciding module comprises at least two butter default values that are different from each other, and any one of the at least two butter default values is served as the buffer distance.

* * * * *